J. F. WATERS.
TIRE GAGE.
APPLICATION FILED JUNE 29, 1912.
1,079,965.
Patented Dec. 2, 1913.
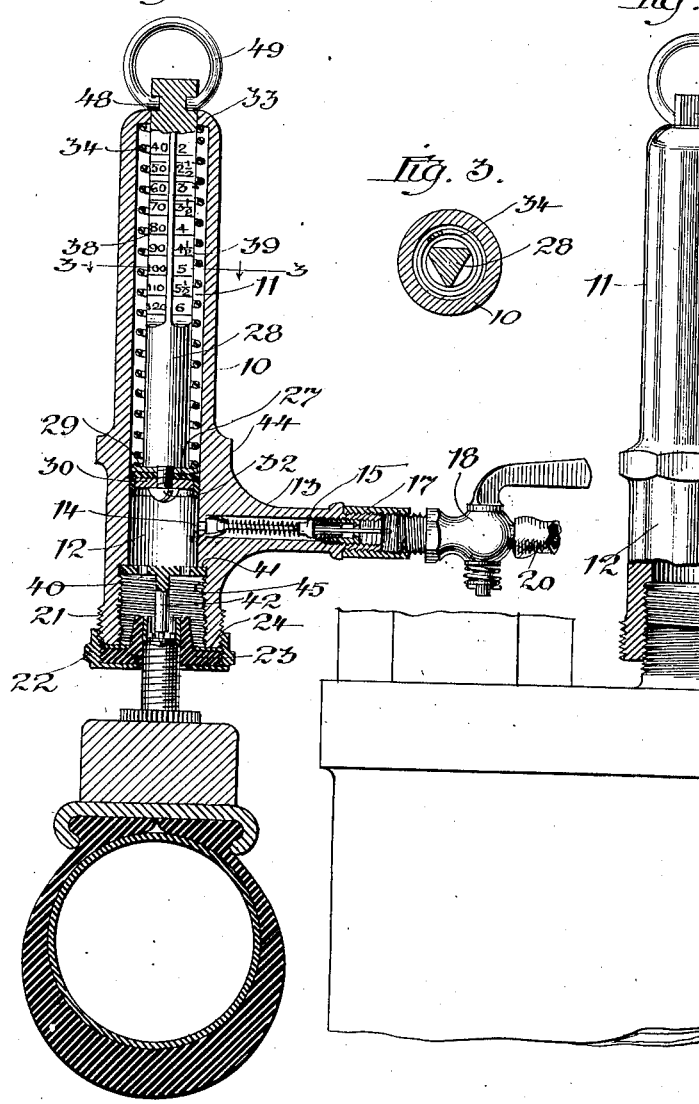

UNITED STATES PATENT OFFICE.

JOHN F. WATERS, OF KANSAS CITY, MISSOURI.

TIRE-GAGE.

1,079,965.  Specification of Letters Patent.  Patented Dec. 2, 1913.

Application filed June 29, 1912. Serial No. 706,610.

*To all whom it may concern:*

Be it known that I, JOHN F. WATERS, a resident of Kansas City, in the county of Jackson and State of Missouri, have invented certain new and useful Improvements in Tire-Gages, of which the following is a full, clear, and exact description.

The invention relates to tire gages for determining the pressure in pneumatic tires and is designed to provide an improved gage which avoids the necessity of providing different gages for use when the tire is being inflated by a manually operated pump, or from a high pressure air tank, or from a power-driven pump.

A purpose of the invention is to provide a gage which may be used with any of the different devices for inflating the tire or independently of an inflating device.

The invention consists in the several novel features hereinafter set forth and more particularly defined by claims at the conclusion hereof.

In the drawings: Figure 1 is a central section of the improved gage applied to a pneumatic tire and with a hose-connection for a high-pressure or storage tank. Fig. 2 is a similar view illustrating the manner of connecting the gage to a power pump to indicate the pressure of air being forced to a tire. Fig. 3 is a section taken on line 3—3 of Fig. 1.

The improved gage comprises a body 10 having a longitudinally extending piston-chamber 11 therein, below which is formed a chamber 12. The body is also provided with a laterally extending nipple 13 which communicates with chamber 12, by an inlet-passage 14. A check-valve 15 of the type which is usually employed in tire-valves, is inserted in nipple 13 to hold the air in chamber 12 and to prevent back passage or escape through said nipple. This nipple has its outer end screw threaded, as at 17, whereby one end of a cock 18 may be secured to said nipple. The other end of the cock is provided with a nipple adapted to be inserted in the end of a hose 20 which may be connected to a manually operated pump or a high pressure tank, (not shown).

The lower end of body 10 is open and is provided with an exterior screw-thread 21 for a cap 22 which is adapted to secure an elastic ring 23 at the lower end of said body, a washer 24 being interposed between the elastic ring and the lower end of the body. This elastic ring is provided with a central opening which is normally smaller than the valve casing of a pneumatic-tire, so that when forced over said casing, it will form an air-tight connection, which will prevent the air in chamber 12 from escaping. This construction provides simple means for connecting the body of a gage to a tire which may be applied by merely forcing the elastic ring around the valve-casing.

A cup-shaped piston 27 is secured to the lower end of its stem 28, by washers 29 and 30 between which said piston is held by a screw 32 which also secures the washers at the lower end of the stem. The upper portion of this stem is guided in an opening 33 formed in the top of the casing and a spring 34 is interposed between the top of the casing and the piston 27, so the pressure of air in the receiving-chamber 12 will shift the piston and stem against the force of said spring according to the pressure in said chamber. A groove 48 is formed in the outer end of stem 28 and a stop-ring 49 is held in said groove, to limit the movement of the piston 27 by spring 34.

The piston-stem 28 is substantially triangular in the cross-section so that it will have at least two faces which are in angular relation to each other and both of which will be visible from one view-point. A scale 38 is marked on one of the angular faces to indicate the pressure in pounds per square inch in the body of the gage and in the tire, and the other face 39 has a scale marked thereon for indicating the different sizes of tires, so that the indications of the pressure-scale when read in connection with these sizes, will indicate the proper pressure for the different sizes of tires. That is when the pressure is sufficient for example, for a four-inch tire, the two scales will simultaneously indicate the four-inch tire and the proper pressure for such a tire. It is important that pneumatic tires should be sufficiently inflated and not over inflated and by providing associated scales on the plunger stem, one for indicating the pressure in the tire and the other for the different sizes of tires, the operator can readily see when the tires of different sizes are properly inflated. The lower portion of the bore in body 10 is provided with an internal screw-thread 45, whereby, when the elastic ring and cap have been removed, the gage may be directly connected to a tire-pump to indicate the pressure of air being supplied to the tire, as shown in Fig. 2.

A perforated plate 40 is seated against a shoulder 41 and carries a stem 42 which is adapted to strike the stem of the check-valve in the tire and hold it open during a pumping operation, so that the pressure in chamber 12 will always be the same as that in the tire. This plate and stem are removable so that when the gage is being used on a power-pump, as shown in Fig. 2, the stem and plate can be removed from the body. The body is provided with a hexagonal portion 44 whereby a wrench may be applied to screw the body firmly into connected relation with the power pump.

When the gage is being used, as shown in Fig. 1, and the hose 20 is connected to a pressure-tank, it is only necessary to open cock 18 until the size of the tire and desired pressure are indicated on the scales 38, 39, on piston stem 28. When the desired pressure is reached, the cock may be closed and the hose disconnected from the tank, or the body 10 may be pulled away from the valve-casing of the pneumatic tire, to permit the check-valve in the tire to close. By employing the cock which is connected to the body of the gage, the pressure from tank or power pump may be controlled to a nicety.

When the improved gage is to be applied to a power-pump as shown in Fig. 2, check-valve 15 is removed from nipple 13 so that air can pass out through said nipple, and cap 22, washer 24, elastic ring 23, and plate 40 with its stem 42 are removed from body 10. The gage is then placed over the usual outlet-nipple 46 of a pump 47, and then turned to cause screw-thread 45 to engage the screw-thread on said nipple, to the position shown in Fig. 2. The improved gage, when thus applied, will serve to indicate the pressure in the line to the tire so that a reading may be taken at the pump instead of at the tire, when the gage is connected to a power pump.

The invention thus provides a gage which is adapted to be used in all the different places where such a device is desired, without providing special devices for each different place of use.

Having thus described the invention, what I claim as new and desire to secure by Letters Patent, is:

1. In a tire-gage, the combination of a body, having a piston-chamber therein, a piston mounted to slide in said chamber, a spring for resisting movement of the piston, a nipple connected to one side of the body, a check-valve removably held in said nipple, an elastic ring removably held on the lower end of said body, a device for releasing the check-valve in a tire, removably held in said body, and an internal screw-thread in the body below the piston-chamber for securing the body to a screw-thread on a power-pump.

2. In a tire-gage, the combination of a body having a piston-chamber therein, a piston mounted to slide in said chamber, a spring for resisting movement of the piston, a nipple connected to one side of the body at an angle thereto, a cock connected to the outer end of said nipple and having means for connection to a hose from an air-supply, means providing a removable elastic ring for connecting said body to a tire-valve, a perforated plate carrying a stem for releasing the check-valve in a tire removably held in said body and an internal screw-thread in the body below the piston-chamber and said plate for detachably securing said body to a screw-thread on a power pump when said plate and ring have been removed.

3. In a tire-gage, the combination of a body, having a piston-chamber therein, a piston mounted to slide in said chamber, a spring for resisting movement of the piston, a nipple connected to one side of the body, a check-valve removably held in said nipple, an elastic ring removably held on the lower end of said body, a device for releasing the check-valve in a tire, removably held in said body, and means in the body below the piston-chamber for securing the body to a power-pump.

JOHN F. WATERS.

Witnesses:
N. TAYLOR,
G. H. WERRIES.